United States Patent Office 3,579,471
Patented May 18, 1971

3,579,471
CELL MODIFYING AGENTS FOR POLYURETHANE FOAMS
Willem Dijkhuizen, Harmannus Kliphuis, and Jan Lolkema, Hoogezand, Netherlands, assignors to Scholten Research N.V., Groningen, Netherlands
No Drawing. Filed Oct. 18, 1967, Ser. No. 676,085
Claims priority, application Great Britain, Oct. 22, 1966, 47,454/66
Int. Cl. S08g 22/44, 53/08
U.S. Cl. 260—2.5                    21 Claims

ABSTRACT OF THE DISCLOSURE

Polyurethane foams having improved physical properties are provided herein by producing the foams in the presence of cell modifying agents, at least one of which is an organic high molecular weight emulsifying agent substantially soluble in mineral oil but substantially insoluble in water, and which emulsifying agent is capable of producing heat-stable water-in-oil emulsions. The emulsifying properties of these new cell modifying agents are such that upon subjecting 20 cm.$^3$ of 0.5% solution of said emulsifying agent in a mineral oil of a viscosity of 1–5° Engler at 20° C. to the A.S.T.M. "Steam Emulsion Test"; the time for separating 5 cm.$^3$ of one of the phases of the emulsion at a temperature of 93° C. to 95° C. is at least 20 minutes.

---

This invention relates to improvements in or relating to polyurethane foams. The invention is more particularly directed to processes of manufacturing improved polyurethane foams, to compositions to be used in said processes and to the polyurethane foams, obtained thereby.

It is already known to manufacture foamed polyurethanes by the interaction of organic polyisocyanates with organic compounds having at least two reactive hydrogen atoms capable of reacting with isocyanate groups, in the presence of blowing agents (gas generating agents), such as low boiling-point organic liquids or water, and of catalysts which promote the urethane formation. This interaction is usually effected in the presence of surfactants, which play an important and mostly essential part in obtaining stable foams with a fine and uniform cell structure. These agents regulate amongst others the shape and size of the cells of the foam and they, therefore, frequently are also referred to as cell modifying agents. Products which have gained great popularity as cell modifying agents in the manufacture of foamed polyurethanes are the organosilicone surfactants such as the polysiloxanes and more particularly the siloxane-oxyalkylene block copolymers.

We have now found that foamed cellular polyurethane products with highly desirable physical characteristics may be obtained by using as a cell modifying agent an emulsifying agent which comprises a mineral oil soluble or dispersible but substantially water insoluble high molecular weight organic compound that produces heat-stable emulsions of the water-in-oil type and has emulsifying properties such that upon subjecting 20 cm.$^3$ of a 0.5% solution of said emulsifying agent in mineral oil to the "steam emulsion test," hereinafter described, the time for separating 5 cm.$^3$ of one of the phases of the emulsion at a temperature of 93 to 95° C. is at least 20 minutes.

Thus according to the invention we provide an improved process for the manufacture of polyurethane foams by the interaction of at least one organic polyisocyanate with at least one organic compound having two or more reactive hydrogen atoms capable of reacting with isocyanate groups, at least one catalyst for the reaction and at least one blowing agent in the presence of one or more cell modifying agents, said process being characterized in that at least one of the cell modifying agents is an emulsifying agent which is soluble or dispersible in mineral oil but substantially insoluble in water, which produces heat-stable emulsions of the water-in-oil type and which has emulisfying properties such that upon subjecting 20 cm.$^3$ of a 0.5% solution of the emulsifying agent in a mineral oil having a viscosity of 1–5° Engler at 20° C. to the "steam emulsion test" hereinafter described the time for sepaarting 5 cm.$^3$ of one of the phases of the emulsion at a temperature of 93–95° C. is at least 20 minutes.

The high molecular weight emulsifying agents useful as cell modifying agents in the manufacture of polyurethane foams according to this invention generally are organic compounds containing in their molecules ester or ether groups, residues of oleophilic components containing at least 8 carbon atoms an at least one residue of a polyhydric alcohol and/or a polybasic acid, said organic compounds having an average molecular weight within the range of from 1000 to 10,000, a hydroxyl number within the range of from 15 to 150 and an acid number within the range of from 0 to 50 and containing per molecule at least 2 oleophilic groupings with 21 or more carbon atoms, or
3 oleophilic groupings with 17 or more carbon atoms, or
4 oleophilic groupings with 14 or more carbon atoms, or
5 oleophilic groupings with 12 or more carbon atoms, or
8 oleophilic groupings with 8 or more carbon atoms.

The aforesaid organic compounds may be obtained by polycondensation, polymerisation or polyaddition reactions, either alone or in combination, of compounds capable of introducing in the reaction products the residues of the components indicated above.

Among compounds capable of introducing the residues of an oleophilic component containing at least 8 carbon atoms, suitable as starting materials for the manufacture of the cell modifying agents of this invention, are higher fatty acids such as occur in natural oils and fats, higher hydroxy fatty acids and the inner esters thereof, polymerized polyunsaturated fatty acids such as e.g. dilinoleic acid, rosin acids, synthetic higher aliphatic acids, partial or complete esters of a higher fatty acid and a polyhydric alcohol such as e.g. mono-, di- and triglycerides or mixtures thereof, natural oils and fats of the non-drying, semidrying and drying type, higher fatty alcohols derived from fatty acids such as lauryl alcohol, oleyl alcohol, elaidyl alcohol, stearyl alcohol and ricinoleyl alcohol, abiethyl alcohol, oxoalcohols, epoxyalkanes containing at least 8 carbon atoms such as epoxyoctadecane. Among compounds capable if introducing the residues of a polyhydric alcohol or a polybasic acid are polyhydric alcohols such as glycerol, sorbitol, mannitol, sorbitan, glycol, erythritol, 2:3 butanediol, polyglycerols, polyglycols and glycidol; polymethylol compounds such as e.g. dimethylolurea, trimethylolmelamine; polyepoxides, e.g. butadiene dioxide, diglycidyl ether, vinylcyclohexene dioxide, glycidyl polyethers of polyhydric alcohols and glycidyl polyethers of polyhydric phenols, polyhalohydrins e.g. glyceroldichlorohydrine and epihalohydrins, e.g. epichlorohydrin; polybasic carboxylic acids such as aliphatic and aromatic dicarboxylic acids and anhydrides thereof, e.g. maleic acid, maleic acid anhydride, fumaric acid, sebacic acid and malic acid and phthalic anhydride, organic polyisocyanates such as aliphatic and aromatic diisocyanates e.g. tolylene diisocyanate, and phosphorus oxychloride.

The nature and relative proportions of the starting materials and the reaction conditions are so selected that the reaction product obtained is soluble or dispersible in mineral oil but substantially insoluble in water and is capable of producing by the "steam emulsion test" hereinafter described an emulsion of 20 cm.³ of water in 20 cm.³ of a solution of 0.5 percent strength of the reaction product in mineral oil from which emulsion not more than 5 cm.³ of one of the phases separate at 93–95° C. in 20 minutes in the said test. In order to determine whether the nature and the relative proportions of the starting materials and the conditions of reacting have been correctly selected in accordance with this invention, tests are carried out on small test portions of the reaction mass which at the same time indicate the development of the emulsifying capacity of the reaction mass, as well as its optimum value. The emulsifying capacity of the reaction product is ascertained by the so-called "Steam Emulsion Test," which is described in detail under No. D 157–36 in A.S.T.M. Standards (1946), Part III–A, page 174. This test enables the time taken for a certain amount of oil or water to be separated from a water-in-old emulsion to be ascertained. It is carried out as follows:

20 cm.³ of the oil to be tested are placed in a glass tube having a depth of 20 centimetres, a diameter of about 2.3 centimetres and a wall thickness of from 0.8 to 1.4 millimetres, and which is graduated in cm.³ from 0 to 50 cm.³ or from 10 to 50 cm.³ The test tube containing the oil, which is initially at room temperature, is supported in a water bath at a temperature within the range 19 to 26° C., at the start of the test. Steam is then admitted into the oil in the tube a such a rate as will maintain the temperature of the oil at from 88 to 91° C., and the passage of steam is continued until the total volume of liquid in the tube (oil and condensed water) amounts to 40±3 cm.³. The steaming should take from 4 to 6½ minutes and is discontinued as soon as the aforesaid volume of liquid is reached. Immediately upon the conclusion of the steaming operation the tube is transferred to a water bath maintained at 93–95° C., the contents of the tube are examined at regular intervals of time and the volume of the separated oil layer and water layer is recorded to the nearest cm.³.

In the present invention the oil, to be tested by the "steam emulsion test" consists of a solution of 0.50 percent strength by weight of the reaction product in mineral oil of a viscosity of 1–5° Engler at 20° C. The mineral oil preferably used in an oil having a viscosity if 3–4° Engler at 20° C. and containing a high percentage of aromatic hydrocarbons. A suitable oil of this kind is the product sold under the trade name "Shell carnea 15" (viscosity 3.8° Engler). Another oil which may be used for the present purpose is the oil known under the trade name "Shell Risella 17" (viscosity 4.3° Engler).

The reaction product possesses the required emulsifying properties if the time for separating 5 cm.³ of one of the phases of the emulsion at a temperature of 93 to 95° C. is at least 20 minutes. According to a preferred embodiment of the present invention reaction products, soluble or dispersible in mineral oil but substantially insoluble in water, are used, which in the steam emulsion test give emulsions of an appreciably greater stability for which the time for separting 5 cm.³ of one of the phases of the emulsion is at least one hour. It has been found that such reaction products are very active cell modifying agents producing extremely fine, uniform and stable polyurethane foams, which are characterizer by a substantially spherical cell structure.

The high molecular weight organic compounds useful as cell modifying agents for the purpose of the invention may be produced by various known processes. According to one method said compounds are produced by heating together a mixture of compounds capable of reacting to form a reaction product containing the residues of a polyhydric alcohol, of a higher fatty acid and of a polybasic acid, the nature and the relative proportions of the compounds and the conditions of heating being so selected that the esterification reaction product obtained has the emulsifying properties hereinbefore defined. Emulsifying agents of this type are described and claimed in British patent specification No. 647,133 and they may be manufactured in accordance with the procedures disclosed therein.

According to these procedures the preferred starting materials are triglycerides such as occur in natural oils and fats, and polybasic carboxylic acids or their anhydrides, e.g. maleic acid, maleic anhydride, fumaric acid, succinic anhydride, adipic acid or sebacic acid. A mixture of said ingredients is heated, generally to a temperature of between 200 and 250° C., for such a time that the esterification reaction product obtained has acquired the emulsifying properties hereinbefore defined. As is indicated in the specification 647,133 the emulsifying properties of the esterification reaction product may be considerably improved if after the heating of the polybasic organic acid or anhydride thereof with the triglyceride has been in progress for some time, a polyhydric alcohol e.g. glycerol is added, and the heating is then continued. Instead of a triglyceride there may be used a partial glycerol ester of a higher fatty acid or of a mixture of higher fatty acids, for example a monoglyceride derived from natural oils and fats, and instead of a polybasic carboxylic acid or anhydride thereof there may be used other polybasic acids or compounds capable of introducing into the esterification reaction product the residues of such polybasic acids, e.g. phosphorus oxychloride or aliphatic and aromatic polyisocyanates such as tolylene diisocyanate. If a drying oil of the linseed oil-type is used as the triglyceride and an ethylene-alpha-beta-dicarboxylic acid or anhydride thereof as the polybasic carboxylic acid, the reaction between the triglyceride and the dibasic carboxylic acid or anhydride may, if desired, also be carried out in the presence of a substance forming organic radicals such as e.g. benzoylperoxide.

Esterification products useful in this invention as cell modifying agents may also be produced by starting from certain polyhydric alcohols containing at least three hydroxyl groups, preferably of a non-linear structure, and esterifying said polyhydric alcohols with a higher fatty acid or a substance capable of introducing the residues of a higher fatty acid. Polyhydric alcohols of this kind, suitable as starting materials, may be obtained e.g. by polycondensation of glycerol.

The esterification reaction products manufactured in the manner described above may still contain a number of free acid groups, corresponding with an acid number within the range of 0–50. If for practical purposes the free acid groups are undesirable, they may be wholly or partially neutralised with substances having an alkaline reaction, such as diethanolamine.

According to another process the high molecular weight organic compounds, soluble or dispersible in mineral oil but substantially insoluble in water useful to be employed as cell modifying agents according to the present invention are produced by heating together (a) a component selected from the group consisting of polyepoxides, polyhalohydrins and epihalohydrins and (b) an oleophilic component having at least 8 carbon atoms selected from the group consisting of aliphatic alcohols, alicyclic alcohols, aliphatic epoxides and alicyclic epoxides, the nature and the relative amounts of said components (a) and (b) and the conditions of heating being so selected that the etherification reaction product obtained is soluble or dispersible in mineral oil but substantially insoluble in water and has acquired emulsifying capacities as required and defined for the cell modifying agents to be used according to this invention. Emulsifying agents of this type may be prepared by the processes described and claimed in Dutch patent specification No. 95,744 and corresponding British patent specification No. 887,442. According to these processes optimum results are achieved when an oleophilic compound, i.e. an alcohol or epoxide, with 12 or more carbon atoms is used as a starting material. Owing to the fact that the cell modifying agents of this type only contain ether linkages they are extremely resistant against hydrolysis, even under alkaline conditions and at elevated temperatures. For many applications the hydrolytic stability of these cell modifying agents is a very useful and important property.

Emulsifying agents useful in this invention as cell modifying agents in the manufacture of foamed polyurethanes can also be produced by still another process which involves prolonged heating and polymerisation, with or without previous or simultaneous oxidation, of fatty oils containing linoleic or linolenic acid, e.g. linseed oil, soyabean oil, cottonseed oil, sesame oil and groundnut oil. The heating of the fatty oil, which is usually carried out at a temperature of about 250° C., should be continued so long, that the polymerisation and/or oxidation reaction product is still soluble in mineral oil but substantially insoluble in water and has acquired emulsifying properties which satisfy the "steam emulsion test" as described above. This type of emulsifying agents can be produced i.a. in accordance with the processes described and claimed in British patent specification No. 187,298.

The organic compounds to be used as cell modifying agents in accordance with the present invention preferably have an average molecular weight in the range of from 1000 to 10,000 and a hydroxyl number within the range of from 15 to 150 and are characterised by a branched or slightly cross-linked structure in which the oleophilic-hydrophilic properties and the degree of branching or crosslinking respectively are so adjusted that said organic compounds possess the desired physical characteristics i.e. that they are soluble or dispersible in mineral oil but substantially insoluble in water and that they satisfy the "steam emulsion test" as hereinbefore defined.

The cell modifying agents may still contain reactive hydrogen atoms capable of reacting with isocyanate groups, e.g. in the form of free hydroxyl or carboxyl groups. If desirable or necessary for obtaining optimum results in certain applications, e.g. in the manufacture of flexible foams, these free hydroxyl or acid groups or other active hydrogen bearing groups, if present, may be blocked up by alkyl- or aryl radicals which do not contain active hydrogen atoms, for example by etherification or esterification. However, in these instances care should be taken that the correct adjustment of oleophilic and hydrophilic properties of the cell modifying agents be maintained. As the aforesaid aftertreatment normally results in a decrease of the hydrophilic properties this decrease should be corrected, which may be done by previously enhancing the hydrophilic characteristics of the high molecular weight organic compound e.g. by the introduction of polyoxyalkylene chains.

In many cases the products obtained according to any of the methods described above, may be used without being previously purified; in some cases, however, it may be desired or necessary to subject said products to a purification treatment.

The cell modifying agents used according to the invention have very valuable properties and they present important and unexpected advantages in the manufacture of polyurethane foams. The present invention in its broad aspects contemplates the uses of these cell modifying agents in all kinds of polyurethane systems, such as in the manufacture of rigid, semi-rigid, semi-flexible and flexible polyurethane foams of the polyether or polyester type, either halohydrocarbon blown, water blown or both. The novel cell modifying agents are preferably used in the manufacture of rigid polyurethane foams and more particularly in the manufacture of rigid polyurethane foams of the polyether type. The invention further encompasses the use of the proposed cell modifying agents in methods for preparing foamed polyurethane materials known as the one-shot, quasiprepolymer or prepolymer techinques, using slabstock, moulding (pour-in-place), frothing or spraying processes, all of which are well known in the art. However, in the manufacture of semi-rigid, semi-flexible and flexible polyurethane foams it is recommended to use the cell modifying agents of this invention in conjunction with surfactants that promote the cell opening reaction, such as special types of organo-silicone surfactants, paraffin oil, dimethyl formamide and dimethyl sulfoxide.

The cell modifying agents used according to the present invention promote a consistent production of uniform, fine-celled foam under widely varied conditions of creaming time, foam height etc. In formulation for rigid foams they produce foams with a high percentage of closed cells with low K-factors and with good dimensional stability and minimal shrinkage. One of the most characteristic and unexpected advantages of said cell modifying agents is that they produce cells which possess a more spherical shape than those of the urethane foams hitherto known, so that the foam properties are more nearly equal in both vertical and horizontal directions. This is confirmed by measuring the compressive strength and water vapor permeability parallel and perpendicular to the foam rise, the ratio of these values being lower than obtained with the best previous cell modified. Moreover, the uniformity obtained in high rise slab foams is better than with organo-silicone surfactants, the density and compressive strength of the top of the bun and the bottom of the bun being more equal when the cell modifying agents in accordance with the present invention are used. These favourable properties of the cell modifying agents in view are extremely important for pour-in-place foams and slab foams of low density, such as are employed in sandwich panels and many other applications. In addition, the new cell modifiers are more economical than the present organo-silicone surfactants.

The amounts of high molecular weight organic compound used as a cell modifying agent in the formulations for the manufacture of polyurethane foams, vary generally from 0.1 percent to 5 percent, calculated on the total weight of the foam formulation. Preferably, the percentage of the cell modifying agent present in the foam formulations varies from 0.5 to 1.5 percent.

The cell modifying agents according to the invention may be used either alone or in combination with known cell modifying agents appropriate for producing stable foamed polyurethane reaction products, e.g. polysiloxanes and siloxane-oxyalkylene block copolymers.

The other starting materials to be employed in the process of the present invention, i.e. the organic polyisocyanates, the organic compounds having at least two reactive hydrogen atoms capable of reacting with isocyanate groups, gas-generating agents and catalysts, may be those more fully described in the prior art as suitable for cellular polyurethane manufacture.

The organic polyisocyanate may e.g. be an aliphatic or aromatic diisocyanate, such as tolylene diisocyanate, diphenylmethane diisocyanate and polymethylene polyphenylisocyanate.

The polyfunctional active hydrogen containing organic compounds may be e.g. polyether polyols, polyester polyols, polyamine polyols, polyester amide polyols or polycarboxylic acid polyols: Suitable polyols for the manufacture of rigid foams are those which are at least trifunctional and have a hydroxyl number of at least 400, whereas for the manufacture of semi-rigid, semi-flexible or flexible foams polyols which are at most trifuctional and have a hydroxyl number lower than 400 are preferred.

The gas-generating agent may be water or a volatile halogenated hydrocarbon, used either separately or in conjunction.

Suitable catalysts include tertiary amines such as triethylene diamine and tetramethyl-1:3-butanediamine and organo-metal compounds such as organo-tin compounds, organo-lead compounds and organo-bismuth compounds. Mixtures of catalysts are often particularly advantageous.

Other adjuvants include thickening agents, for example ethyl cellulose, pigments, colouring matter, fireproofing agents for example tri-(β-chloroethyl)phosphate or antimony compounds, or mixtures thereof, and anti-oxidants such as tert-butyl catechol.

The invention also encompasses foam compositions comprising at least one organic polyisocyanate, at least one organic compound having two or more reactive hydrogen atoms capable of reacting with isocyanate groups, at least one catalyst for the reaction and at least one blowing agent, which are characterized in that they contain at least one cell modifying agent consisting in part or in whole of a high molecular weight emulsifying agent as defined herebefore.

The above compositions are unstable and therefore generally unsuitable for being marketed as such. Stable compositions capable of being converted into polyurethane foams may be obtained by mixing the organic compound, the catalyst, the blowing agent and the cell modifying agent. In order to produce the foam this composition is mixed with the polyisocyanate.

Other useful compositions may be obtained by mixing the organo compound with the cell modifying agent. This composition may be converted into a polyurethane foam by adding the polyisocyanate, the catalyst and the blowing agent.

The invention covers the compositions mentioned above and also the final products obtained by any of the processes described in the preceding specification.

The advantages and utility of the present invention will become further apparent from the examples which follow. In these examples the manufacture of various high molecular weight emulsifying agents and their use as cell modifying agents in the production of a variety of foamed polyurethanes is described.

The hydroxyl and acid numbers referred to in the examples were obtained by the methods described by Brauer and Horowitz in Analytical Chemistry of Polymers Vol. XII, Part III, p. 82–86 (Interscience Publishers).

The average molecular weight of the emulsifying agents was determined by means of a Mechrolab Vapor Pressure Osmometer, using carbon tetrachloride as the solvent.

The emulsifying capacity of the high molecular weight reaction products to be used as cell modifying agents according to this invention was tested on 0.5 percent by weight solutions in mineral oil of a viscosity of 1 to 5 Engler degrees at 20° C. As is indicated hereinbefore the so-called "steam emulsion test" was performed in accordance with A.S.T.M. Designation No. D 157–36.

The density of the foam was determined by weighing cubic samples at 10 cm. x 10 cm. x 10 cm. and expressing the density in g./l. The compressive strength was ascertained by the procedure described in A.S.T.M. Designation No. D 1621–64. An Instron testing machine with equipment for compression testing was used and the compressive strength given in kg./cm.$^2$ for 10% deflection.

The open cell content was measured by a test method described by Doherty, Hurd and Lester in Chemistry and Industry 1962, p. 1340.

Rigid polyurethane foam produced according to this invention is useful more especially for heat insulation purposes after the manner per se known in the art. Semiflexible or semi-rigid polyurethane foam produced according to this invention is useful for sound insulation purposes after the manner per se known in the art. Flexible foam produced according to this invention is useful for cushioning purposes after the manner per se known in the art.

The invention will now be illustrated but not limited by the following examples, in which parts and percentages are by weight:

EXAMPLE 1

A mixture of 700 parts of technical palm oil monoglyceride and 70 parts of adipic acid is heated in a $CO_2$ atmosphere at 230° C. for 40 minutes.

Thereupon 126 parts of fumaric acid are added and heating is continued for 50 minutes at 220° C. When a glass rod is dipped into a sample and taken out, the reaction mass shows signs of pulling into threads. The entire mixture is cooled down to 160° C. and heated at this temperature for another 40 minutes. The resulting highly viscous, esterification reaction product is soluble in mineral oil but insoluble in water and has an average molecular weight of 1988, a hydroxyl number of 78 and an acid number of 28. It contains per molecule more than 5 palmitic and/or oleic acid groupings. When 20 cm.$^3$ of a 0.5% solution of the reaction product obtained in mineral oil of a viscosity of 3.8 E at 20° C. (Shell Carnea 15) is subjected to the "steam emulsion test," only 0.25 cm.$^3$ of oil and 0 cm.$^3$ of water separate off after 60 minutes at 93–95° C.

The esterification reaction obtained in this way is employed as a cell modifying agent in the following formulation to produce a rigid polyurethane foam by the one-shot method:

| Component: | Parts by weight |
| --- | --- |
| Starch-based Polyol [1] | 500.0 |
| Cell modifying agent | 10.0 |
| Tetramethylbutane diamine | 3.4 |
| Dibutyltin dilaurate | 0.5 |
| Trichlorofluormethane | 180.0 |
| Diphenylmethane-4,4'-diisocyanate [2] | 594.0 |

[1] A propyleneoxide adduct derived from starch having a hydroxyl number of 476 and sold under the trade name Fox-o-Pol S480.
[2] Desmodur 44 V Farbenfabriken Bayer A.G.; equivalent weight 133.

The components are stirred together vigorously for 20 seconds and poured into an open mould. The reaction mixture expands and hardens, giving a regular fine-pored rigid polyurethane foam with more than 90% of closed cells. The cream time and rise time are 43 and 115 seconds, respectively. The foam height is 68 cm. The lower, upper and side foam layers are cut away and from the remaining core five consecutive overhead cubes of 10 cm. edge are cut as samples. Of these samples the density and the compressive strengths parallel to the rise are measured:

| Upper sample, density g./l.: | Compressive strength kg./cm.$^2$ |
| --- | --- |
| 31.7 | 1.50 |
| 32.9 | 1.95 |
| 33.0 | 1.85 |
| 33.9 | 2.70 |
| Lower sample, density g./l.: | |
| 34.7 | 2.95 |

To compare these results with the best previous cell modifying agent—an organo-silicone block compolymer designated "L 5320" by its manufacturer—another foam was prepared using an identical formulation:

| Component: | Parts by weight |
| --- | --- |
| Fox-o-Pol S480 | 500.0 |
| Silicone L 5320 | 10.0 |
| Tetramethylbutane diamine | 2.0 |
| Dibutyltin dilaurate | 0.5 |
| Trichlorofluormethane | 175.0 |
| Desmodur 44 V | 594.0 |

The resulting foam had a cream time and rise time of 43 and 120 seconds respectively. The foam height is 67 cm. When similar cubic samples of the core are taken, they exhibit the following densities and compressive strengths parallel to the rise:

| Upper sample, density g./l.: | Compressive strength kg./cm.$^2$ |
| --- | --- |
| 31.8 | 0.90 |
| 33.1 | 2.00 |
| 33.5 | 2.35 |
| 34.8 | 3.95 |
| Lower sample, density g./l.: | |
| 35.8 | 4.10 |

These figures show that the new cell modifying agent shows in vertical direction less variation in density and compressive strength and therefore produces a more homogeneous foam than the best silicone block copolymer previously used.

EXAMPLE 2

Polyglycerol is made by heating 2000 parts of glycerol 98% and 40 parts of sodium acetate under a reduced pressure of 5 to 6 cm. Hg during 14 hours, the temperature being increased from 180° to 250° C. The distillate loss in this period is 516 parts by weight. 700 parts of the polyglycerol, 5 parts of magnesium stearate and 1025 parts of oleic acid are heated in a $CO_2$ atmosphere for 2 hours at a temperature of 230° C. The low viscous esterification reaction product obtained is soluble in mineral oil but substantially insoluble in water and possesses an average molecular weight of 1243, a hydroxyl number of 99 and an acid number of 42. The said reaction product contains more than 3 oleic acid groups per molecule and is capable of producing heat stable emulsions of the water-in-oil type. When subjecting 20 cm.³ of a 0.5% solution of the reaction product in mineral oil of a viscosity of 3.8° E at 20° C. (Shell Carnea 15) to the "steam emulsion test" only 0.25 cm.³ of oil and 0 cm.³ of water separate from the emulsion in 60 minutes at 93–95° C.

The esterification reaction product obtained in this way is used as a cell modifying agent in the following formulation for rigid polyurethane foam:

| Component: | Parts by weight |
|---|---|
| Glycerol Polyol [1] | 266.0 |
| Cell modifying agent | 5.0 |
| Tetramethylbutane diamine | 1.8 |
| Dibutyltin dilaurate | 0.6 |
| Trichlorofluormethane | 80.0 |
| Diphenylmethane-4,4'-diisocyanate [2] | 280.0 |

[1] Pluracol G.P. 430 having a hydroxyl number of 420.
[2] Desmodur 44 V.

The vigorously mixed composition is poured in an open mould to make a high-rise rigid foam. The cream time and rise time are respectively 30 and 100 seconds.

A uniform foam with over 90% of closed, spherical cells is obtained. Samples are taken from the lower and upper part of the bun and the density and compressive strength are determined:

| Density | Compressive strength parallel to rise, kg./cm.² |
|---|---|
| Upper sample 36.4 g./l. | 2.45 |
| Lower sample 36.5 g./l. | 2.40 |

From these figures it is seen that the density uniformity and strength uniformity of the foam is excellent.

EXAMPLE 3

900 parts of technical palm oil monoglyceride and 90 parts of adipic acid are heated under stirring in a nitrogen atmosphere for 40 minutes at a temperature of 220° C. After the reaction mixture is cooled to 180° C., 162 parts of fumaric acid are added, whereupon heating is continued from 195 minutes at 215–220° C. The highly viscous reaction product thus obtained is very soluble in mineral oil but completely insoluble in water and has an average molecular weight of 3759, a hydroxyl number of 125 and an acid number of 30. When 20 cm.³ of a 0.5% solution of said reaction product in mineral oil of a viscosity of 3.8° E at 20° C. (Shell Carnea 15) is subjected to the "steam emulsion test," no oil or water separate after 20 minutes at 93–95° C. and only 0.25 cm.³ of oil and 0 cm.³ of water separate after 60 minutes at 93–95° C.

The above described reaction product is compared as a cell modifying agent with the organo-silicone block copolymer L 5320 in the following one-shot formulation for rigid foam:

| Component: | Parts by weight |
|---|---|
| Aromatic polyol [1] | 275.5 |
| Cell modifying agent | 5.0 |
| Tetramethylbutane diamine | 2.1 |
| Dibutyltin dilaurate | 0.25 |
| Trichlorofluormethane | 85.0 |
| Polymethylene polyphenylisocyanate [2] | 280.0 |

[1] Sold under the trade name of "Niax T 221" and having a hydroxyl number of 400.
[2] Sold under the trade name of "Papi" and which has an isocyanate equivalent of 133.5.

The components are mixed vigorously and are poured in an open mould, where they expand to a rigid polyurethane foam. When the viscous product of Example 3 is used as the cell modifying agent, the cream time is 42 seconds and the rise time 190 seconds. A regular foam consisting of fine closed cells is obtained with a core density of 33.5 g./l. The compressive strength parallel and perpendicular to the rise are 2.25 and 1.50 kg./cm.², respectively.

In case L 5320 is used as the cell modifying agent the cream time and rise time are 37 and 128 seconds, respectively. The cells are fine and the foam is regular, having a core density of 34.0 g./l. The compressive strengths parallel and perpendicular to the foam rise are 3.50 and 1.35 kg./cm.² respectively. From the figures it may be concluded that the cell modifying agent of Example 3 forms a foam with more spherical cells than the silicone surfactant, the compressive strengths parallel and perpendicular to the foam rise being more equal for the product of the present invention. This is confirmed by the water vapor permeability figures, tested on vertical and horizontal disks of 5 cm. diameter and 1.5 cm. height. With the cell modifier of Example 3 the water vapor permeability after 240 hours parallel and perpendicular to foam rise are 391 mg. and 329 mg., the ratio being 1.2. With the silicone cell modifier these figures are 410 mg. and 191 mg., the ratio being 2.1. From these figures it may be concluded that the new cell modifying agent produces cells of lower orthotropicity than the silicone surfactant does.

EXAMPLE 4

This example shows the use of the cell modifying agent described in Example 3 in a fire retardant polyurethane foam composition. The following formulation is used:

| Component: | Parts by weight |
|---|---|
| Phosphorus containing polyol [1] | 260.5 |
| Cell modifying agent | 5.0 |
| Tetramethylbutane diamine | 3.75 |
| Dibutyltin dilaurate | 0.25 |
| Trichlorofluormethane | 82.5 |
| Polymethylene polyphenylisocyanate [2] | 280.0 |

[1] Fox-o-Pol P440 a phosphorus containing polyol derived from starch; hydroxyl number 431, P content 3.3%.
[2] Papi.

This formulation forms a rigid foam having fire retardant properties. The cream time and rise time are 50 and 190 seconds, respectively. The foam has a fairly fine cell structure. The core density is 3.9 g./l. and the linear shrinkage is 0.5%. The ratio of water vapor permeability parallel and perpendicular to the foam rise is 1.4, while a silicone based cell modifier gives a ratio of 2.0 in the same formulation.

EXAMPLE 5

According to Example 2 of British Pat. No. 647,133 an emulsifier is made by heating 750 parts of ground nut oil and 113 parts of maleic anhydride for 2 hours at 200° C. in a current of $CO_2$ gas to prevent oxidation. The temperature is subsequently slowly increased to 230° C., which temperature is maintained for 2 hours. After the temperature is lowered to 180° C. 32 parts of glycerol are added, whereupon the temperature is raised again to 230° C. and held at this temperature for another 4 hours. After cooling a viscous reaction product is obtained, which is extremely soluble in mineral oil but insoluble in water and has an average molecular weight of 1610, a hydroxyl number of 32 and an acid number of 10. It contains per molecule more than 4 oleophilic groupings, containing predominantly 17 carbon atoms. On subjecting 20 cm.³ of a 0.5% solution of the said reaction product in mineral oil of 4.3° E viscosity at 20° C. (Shell Risella 17) to the "steam emulsion test" the emulsion separates only 0.75 cm.³ of oil and 0 cm.³ of water after 20 minutes at 93–95° C. and 1.0 cm.³ of oil and no water after 60 minutes at 93–95° C.

The reaction product described above is employed as a cell modifying agent in the manufacture of a one-shot, rigid polyurethane foam of the polyether type:

| Component: | Parts by weight |
| --- | --- |
| Starch-based polyol [1] | 46.3 |
| Cell modifying agent | 1.0 |
| Tetramethylbutane diamine | 0.15 |
| Dibutyltin dilaurate | 0.05 |
| Trichlorofluormethane | 17.0 |
| Diphenylmethane-4,4'-diisocyanate [2] | 54.2 |

[1] Fox-o-Pol S480.
[2] Desmodur 44 V.

The cream time and rise time of this mixture are 41 and 175 seconds respectively. An excellent, rigid polyurethane foam with over 90% of closed cells is formed. The density is 32.5 g./l. and the linear shrinkage 1%. Under the stereomicroscope it is clearly discernible that the cells of the foam are characterized by an essentially spherical shape.

EXAMPLE 6

175 parts of a technical monoglyceride of palm oil are dissolved in 350 parts of toluene. After addition of 30 parts of magnesium oxide, 51 parts of phosphorus oxychloride are gradually introduced.

Thereupon the mixture is heated for 1 hour at a temperature of 95° C. After the solid residue is removed by filtration, the toluene is distilled off in vacuo in a film type evaporator at 100° C. The esterification reaction product obtained is soluble in mineral oil but insoluble in water and has an average molecular weight of 1329, a hydroxyl number of 17 and an acid number of 8.

Upon subjecting 20 cm.³ of a 0.5% solution of said reaction product in mineral oil of a viscosity of 3.8° E at 20° C. (Shell Carnea 15) to the "steam emulsion test" no oil and water separate off after 20 minutes at 93–95° C., while 1.0 cm.³ of oil and no water have separated after 60 minutes at 93–95° C.

A rigid polyurethane foam is prepared from the following formulation, using the cell modifying agent described above.

| Component: | Parts by weight |
| --- | --- |
| Starch-based polyol [1] | 46.3 |
| Cell modifying agent | 1.0 |
| Tetramethylbutane diamine | 0.15 |
| Dibutyltin dilaurate | 0.05 |
| Trichlorofluormethane | 17.0 |
| Diphenylmethane-4,4'-diisocyanate [2] | 54.2 |

[1] Fox-o-Pol S480.
[2] Desmodur 44 V.

The cream time and rise time are 39 and 145 seconds, respectively. A sample taken from the core has a fine, open cell structure of a more or less spherical shape. The density is 32.0 g./l.; the linear shrinkage 0.75%.

EXAMPLE 7

Over a period of 2 hours 60 parts of tolylene diisocyanate are gradually added to 150 parts of glycerol monooleate (Myverol 18–71 Distillation Products Industries Division of Eastman Kodak Company), which are heated to a temperature of 75° C. The heating is continued after the addition is completed for one hour. The resulting reaction product is a viscous product that is substantially soluble in mineral oil but insoluble in water and possesses an average molecular weight of 5513, a hydroxyl number of 51 and an acid number of 11. Per molecule approximately 11 oleic groupings are present. A 0.5% solution of the said reaction product in mineral oil of 4.3° E viscosity at 20° C. (Shell Risella 17) is subjected to the "steam emulsion test." The resulting emulsion separates 1.5 cm.³ of oil and 4.5 cm.³ of water in 20 minutes at a temperature of 93 to 95° C.

The reaction product prepared in this way is employed as a cell modifying agent in the following formulation for the manufacture of a rigid polyurethane foam employing the one-shot technique.

| Component: | Parts by weight |
| --- | --- |
| Starch-based polyol [1] | 46.3 |
| Cell modifying agent | 1.0 |
| Tetramethylbutane diamine | 0.18 |
| Dibutyltin dilaurate | 0.05 |
| Trichlorofluormethane | 17.0 |
| Diphenylmethane-4,4'-diisocyanate [2] | 54.2 |

[1] Fox-o-Pol S480.
[2] Caradate 30, isocyanate equivalent 132.

The cream time is 30 seconds and the rise time is 105 seconds. The mixture gives a rigid foam with extremely fine round cells. The open cell content is over 90%. Density of a sample taken from the core is 31.0 g./l. and the linear shrinkage 1.0%.

EXAMPLE 8

By heating 2000 parts of glycerol 98% and 40 parts of sodium acetate under a reduced pressure of 2 to 6 cm. Hg during 19 hours at a temperature of 180° to 245° C. polyglycerol is made. 210 parts of this polyglycerol are heated with 1 part of magnesium stearate and 308 parts of stearic acid in a $CO_2$ atmosphere during 2 hours at 230° C., to give a polyglycerol stearate. 130 parts of this polyglycerol stearate are heated to 100° C. and over a period of 30 minutes 15 parts of fumaric acid are added. Thereupon the mixture is heated in a $CO_2$ atmosphere for 75 minutes at a temperature of 200° C. The resulting esterification reaction product is soluble in mineral oil but substantially insoluble in water and has an average molecular weight of 2494, a hydroxyl number of 145 and an acid number of 23. Per molecule about 5 stearic acid groupings are present. When subjecting 20 cm.³ of 0.5% solution of the said reaction product in mineral oil of a viscosity of 3.8° E at 20° C. (Shell Carnea 15) to the "steam emulsion test" a heatstable emulsion of the water-in-oil type is obtained, from which emulsion 0.5 cm.³ of oil and 0 cm.³ of water separate in 60 minutes at a temperature of 93–95° C.

The above reaction product is used as a cell modifying agent in the manufacture of a one-shot fluorocarbon blown, rigid polyurethane foam of the polyether type:

| Component: | Parts by weight |
| --- | --- |
| Methylglucoside polyol [1] | 50.0 |
| Cell modifying agent | 1.0 |
| Tetramethylbutane diamine | 0.35 |
| Dibutyltin dilaurate | 0.05 |
| Trichlorofluormethane | 18.0 |
| Polymethylene polyphenylisocyanate [2] | 59.7 |

[1] A laboratory sample made from methylglucoside and propylene oxide having a hydroxyl number of 471.
[2] Papi.

The formulation has a cream time of 45 seconds and a rise time of 180 seconds. The rigid foam has fine, round, closed cells. The core density is 32 g./l. and the linear shrinkage 0.25%.

EXAMPLE 9

91 parts of sorbitol, 2.5 parts of magnesium stearate and 282 parts of oleic acid are heated for 1.5 hours in a $CO_2$ atmosphere at a temperature of 230° C. Then 46.5 parts of fumaric acid are added and the mixture is heated for 165 minutes at a temperature of 220° C. under a $CO_2$ blanket. The esterification reaction product thus obtained has a stringy character and is very soluble in mineral oil but insoluble in water. The reaction product has an average molecular weight of 1970, a hydroxyl number of 25 and an acid number less than 1 and is capable of producing heat-resistant emulsions of the water-in-oil type. When subjecting 20 cm.³ of a 0.5% solution of the said reaction product in mineral oil of a viscosity of 3.8° E at 20° C. (Shell Carnea 15) to the "steam emulsion test" only 0.25 cm.³ of oil and no water separate off at 93–95° C. after 60 minutes.

A rigid foam is made whereby the reaction product described above is incorporated as a cell modifying agent in the following formulation:

| Component: | Parts by weight |
|---|---|
| Starch-based polyol [1] | 46.3 |
| Cell modifying agent | 1.0 |
| Tetramethylbutane diamine | 0.25 |
| Dibutyltin dilaurate | 0.07 |
| Trichlorofluormethane | 17.0 |
| Diphenylmethane-4,4'-diisocyanate [2] | 57.5 |

[1] Fox-o-Pol S480.
[2] Suprasec D.N. having an isocyanate equivalent of 140.

The mixture is stirred vigorously and poured in an open mould. The cream time is 48 seconds and the rise time is 200 seconds. The rigid polyurethane foam has a uniform, fine cell structure with a closed cell content of over 90%. The core density is 33.0 g./l. and the linear shrinkage 0.5%.

EXAMPLE 10

1.5 parts of boron trifluoride etherate (48%) are dissolved in 260 parts of erucylalcohol. At a temperature of 70° C. 75 parts of a polyglycidylether of glycerol (Epikote 812 marketed by Shell Chemical Corporation) are added over a period of 20 minutes, whereupon the mixture is heated at 70° C. for 15 minutes. Then, a new portion of 67.5 parts of Epikote 812 is added in 20 minutes and the mixture is heated for another 15 minutes. The resulting etherification reaction product is very soluble in mineral oil but completely insoluble in water; it has an average molecular weight of 1105, a hydroxyl number of 83 and an acid number of 5 per molecule more than 2 erucylalcohol residues are present. When subjecting 20 cm.³ of 0.5% solution of the said reaction product in mineral oil of 3.8° E viscosity at 20° C. (Shell Carnea 15) to the "steam emulsion test" a heat stable emulsion of the water-in-oil type is obtained, from which no oil and water separate after 60 minutes at 93–95° C.

A rigid foam is made using the following one-shot formulation in which the above etherification reaction product is employed as a cell modifying agent:

| | |
|---|---|
| Sorbitol polyol [1] | 45.4 |
| Cell modifying agent | 1.0 |
| Tetramethylbutane diamine | 0.17 |
| Dibutyltin dilaurate | 0.04 |
| Trichlorofluormethane | 17.0 |
| Diphenylmethane-4,4'-diisocyanate [2] | 54.2 |

[1] Atpol 2410, a polyetherpolyol derived from sorbitol, having a hydroxyl number of 490.
[2] Desmodur 44 V.

The cream time and rise time of this formulation are 40 and 125 seconds respectively. The foam has a regular fine cell structure, with more than 90% of closed spherical cells. The core density is 31.5 g./l. and the linear shrinkage 0.25%.

EXAMPLE 11

100 parts of dimer acid (Empol 1022 manufactured by Unilever-Emery N.V.) and 16 parts of glycerol 98% are heated for 25 minutes at a temperature of 220° C. A stirring rod dipped in and taken out from the cooled mixture pulls threads. The esterification reaction product obtained is dispersible in mineral oil but insoluble in water and has an average molecular weight of 4295, a hydroxyl number of 139 and an acid number of 1. When subjecting 20 cm.³ of a 0.5% solution of the esterification product in mineral oil of 3.8° E viscosity at 20° C. (Shell Carnea 15) to the "steam emulsion test" a heat-resistant emulsion of the water-in-oil type is obtained, from which emulsion 1.0 cm.³ of oil and 0 cm.³ of water separate at a temperature of 93 to 95° C. in 20 minutes.

The above esterification reaction product is used as a cell modifying agent in the following formulation:

| Component: | Parts by weight |
|---|---|
| Starch-based polyol [1] | 46.3 |
| Cell modifying agent | 1.0 |
| Tetramethylbutane diamine | 0.25 |
| Dibutyltin dilaurate | 0.06 |
| Trichlorofluormethane | 17.0 |
| Polymethylene polyphenylisocyanate [2] | 54.2 |

[1] Fox-o-Pol S480.
[2] PAPI.

The cream time and rise time are respectively as follows: 42 and 190 seconds. A sample of rigid foam taken from the core exhibits a regular spherical cell structure. The density is 30.5 g./l. and the linear shrinkage 1.0%.

EXAMPLE 12

A mixture of 275 parts of linseed oil and 4 parts of benzoyl peroxide is heated to 100° C. Then 15 parts of maleic acid anhydride are added and the temperature is increased over a period of one hour to 200° C. Thereupon the mixture is reacted at this temperature for 3 hours. After addition of 13 parts of calcium acetate the mixture is heated for one hour at a temperature of 250° C. The viscous reaction product is soluble in mineral oil but insoluble in water. It is subjected as a 0.5% solution in mineral oil of a viscosity of 3.8° E at 20° C. (Shell Carnea 15) to the "steam emulsion test." After 20 minutes the emulsion thus obtained separates 1 cm.³ of oil and no water at 93–95° C. The hydroxyl number of the product is 54, the acid number 20 and the average molecular weight 1194. The product contains per molecule approximately 4 linseed oil fatty acid groupings.

The high molecular weight organic compound described above is used as a cell modifying agent in the following one-shot foam formulation:

| Component: | Parts by weight |
|---|---|
| Sorbitol polyol [1] | 45.4 |
| Cell modifying agent | 1.0 |
| Tetramethylbutane diamine | 0.30 |
| Dibutyltin dilaurate | 0.10 |
| Trichlorofluormethane | 17.0 |
| Diphenylmethane-4,4'-diisocyanate [2] | 57.5 |

[1] Atpol 2410.
[2] Suprasec DN.

This formulation forms a rigid foam which is built up of fine closed cells. The cream time and the rise time are 20 and 95 seconds respectively. The core density is 29.0 g./l. and the linear shrinkage is 0.5%.

EXAMPLE 13

500 parts of soya oil are heated for 7 hours at a temperature of 250° C., while heated air is passed through the oil. The resultant polymerised product is stringy but non-gelatinised. It dissolves in mineral oil of 3.8° E viscosity at 20° C. (Shell Carnea 15) and forms in 0.5% concentration a stable emulsion when subjected to the "steam emulsion test"; after 20 minutes at a temperature of 93 to 95° C. the emulsion separates 0.25 cm.³ of oil and 0 cm.³ of water. The polymerization reaction product has an average molecular weight of 1888, a hydroxyl number or 35 and an acid number of 4. It is insoluble in water and contains per molecule more than 6 oleophilic residues of soya oil fatty acids.

The above polymerization reaction product is employed as a cell modifying agent in the following foam forming formulation:

| Component: | Parts by weight |
|---|---|
| Sorbitol polyol [1] | 45.4 |
| Cell modifying agent | 1.0 |
| Tetramethylbutane diamine | 0.15 |
| Dibutyltin dilaurate | 0.05 |
| Trichlorofluormethane | 17.0 |
| Diphenylmethane-4,4'-diisocyanate [2] | 54.2 |

[1] Atpol 2410.
[2] Desmodur 44 V.

The cream time of this composition is 35 seconds and the rise time 135 seconds. The closed-cell structure is uniform and fairly fine. The linear shrinkage of a sample with core density 35 g./l. is 0.25%.

EXAMPLE 14

Polyglycerol having a hydroxyl number of 1247, is made by heating 3000 parts of glycerol 98% and 60 parts of sodium acetate during 11 hours at a temperature of 220° C. under a pressure of 8 cm. Hg. 830 parts of the polyglycerol are esterified with 1410 parts of oleic acid by heating in the presence of 10 parts of magnesium stearate at a temperature of 230° C. during 2 hours in a $CO_2$ atmosphere.

90 parts of the polyglycerol oleate are dissolved in 90 parts of xylene and to this solution a solution of 15 parts of tolylene diisocyanate in 15 parts of xylene is gradually added at a temperature of 60°–70° C. The mixture is reacted by heating for 30 minutes at this temperature. Thereupon another 10 parts of tolylene diisocyanate dissolved in 10 parts of xylene are added in three portions over periods of 5 minutes. The mixture is reacted after each addition for 30 minutes by heating to 60–70° C. Finally the xylene is removed by vacuum distillation. The esterification reaction product thus obtained has a hydroxyl number of 50, an acid number of 1 and an average molecular weight of 2858. It is soluble in mineral oil and insoluble in water. The said reaction product is capable of producing heat stable emulsions of the water-in-oil type and when subjecting 20 cm.³ of a 0.5% solution of the reaction product in mineral oil of 3.8° E viscosity at 20° C. (Shell Carnea 15) to the "steam emulsion test" only 0.5 cm.³ of oil and 0 cm.³ water separate from the emulsion in 20 minutes and 1.0 cm.³ of oil and 0 cm.³ of water in 60 minutes at 93–95° C.

The above esterification reaction product is employed as cell modifying agent in the following formulation to produce a rigid polyether polyurethane foam by the one-shot method and using a halocarbon and water as blowing agents:

| Component: | Parts by weight |
|---|---|
| Starch-based polyol [1] | 50.0 |
| Cell modifying agent | 1.0 |
| Dibutyltin dilaurate | 0.05 |
| Triethylene diamine [2] | 0.70 |
| Trichlorofluormethane | 9.0 |
| Water | 1.0 |
| Diphenylmethane-4,4'-diisocyanate [3] | 77.1 |

[1] Fox-o-Pol S480.
[2] Dabco 33 LV.
[3] Desmodur 44 V.

The cream time and rise time of this formulation are 36 and 122 seconds respectively.

A rigid foam with more than 90% closed cells, which have an extremely regular and fine round structure, is formed. The core density is 31 g./l. and the linear shrinkage is 0.75%.

EXAMPLE 15

The esterification reaction product of Example 14 is used as a cell modifying agent in the manufacture of a rigid polyurethane foam according to the quasi-prepolymer technique.

| Component: | Parts by weight |
|---|---|
| Starch-based polyol [1] | 50.0 |
| Cell modifying agent | 1.0 |
| Tetramethylbutane diamine | 0.2 |
| Triethylene diamine [2] | 1.0 |
| Trichlorofluormethane | 20.0 |
| Water | 0.5 |
| Prepolymer [3] | 78.0 |

[1] Fox-o-Pol S480.
[2] Dabco 33 LV.
[3] A prepolymer containing 28.5% free NCO groups made from 1 eq. Fox-o-Pol S480 and 4.5 eq. tolylene diisocyanate 80/20.

The cream time and rise time of this formulation are 19 and 153 seconds, respectively. The resulting foam has over 90% of closed, extremely fine cells. The density of the foam is 26.5 g./l. and the linear shrinkage is 0.25%.

A similar formulation, in which the water is omitted, has the following composition:

| Component: | Parts by weight |
|---|---|
| Starch-based polyol [1] | 50.0 |
| Cell modifying agent | 1.0 |
| Tetramethylbutane diamine | 0.15 |
| Tirethylene diamine [2] | 0.4 |
| Trichlorofluormethane | 20.0 |
| Prepolymer [3] | 68.2 |

[1] Fox-o-Pol S480.
[2] Dabco 33 LV.
[3] A prepolymer containing 28.5% free NCO groups made from 1 eq. Fox-o-Pol S480 and 4.5 tolylene diisocyanate 80/20.

The cream time of this formulation is 35 seconds and the rise time 315 seconds. A rigid urethane foam of uniform, fine closed-cell structure is obtained, having a core density of 32.0 and a linear shrinkage of 0.25%.

EXAMPLE 16

Polyglycerol having a OH number of 1084 is obtained by heating 2000 parts of glycerol and 4 parts of sodium acetate for 8 hours at a temperature of 200°–220° C. and 2.5 hours at 220°–230° C. under a reduced pressure of 6 cm. Hg. 1000 parts of this polyglycerol are heated with 1300 parts of oleic acid and 10 parts of magnesium stearate for 2 hours at a temperature of 230° C. in a $CO_2$ atmosphere to yield polyglycerol oleate. To 100 parts of this polyglycerol oleate dissolved in 100 parts of xylene are slowly added at a temperature of 60° C. 15 parts of tolylene diisocyanate dissolved in 15 parts of xylene. After this addition the mixture is reacted for 45 minutes at 60° C. Thereupon 3 parts of tolylene diisocyanate dissolved in 3 parts of xylene are added and the reaction is allowed to proceed for another 45 minutes at 60° C. Finally a last portion of 3 parts of tolylene diisocyanate in 3 parts of xylene is added and reacted for 45 minutes at 60° C. The resulting product is soluble in mineral oil and insoluble in water. When a 0.5% solution in mineral oil of 4.3° E viscosity at 20° C. (Shell Risella 17) is subjected to the "steam emulsion test," 0.75 cm.³ of oil and 0 cm.³ of water are separated after 20 minutes at 93°–95° C. and 1.25 cm.³ of oil and 0.25 cm.³ of water after 60 minutes at this temperature. The hydroxyl number of the solvent free esterification reaction product is 49, the acid number 3 and the average molecular weight 1721.

This reaction product is used in the following formulation as cell modifying agent in the preparation of a rigid polyurethane foam of the polyester type:

| Component: | Parts by weight |
|---|---|
| Polyester polyol [1] | 60.0 |
| Cell modifying agent | 2.0 |
| Dibutyltin dilaurate | 0.05 |
| Triethylene diamine [2] | 0.4 |
| Trichlorofluormethane | 9.0 |
| Water | 1.0 |
| Diphenylmethane-4,4'-diisocyanate [3] | 77.1 |

[1] Polyester RM 17 having a hydroxyl number of 400.
[2] Dabco 33 LV.
[3] Desmodur 44 V.

The mixture has a cream time of 69 seconds and a rise time of 270 seconds.

A rigid foam with a regular, fine-celled structure is obtained, having a core density of 46.5 g./l. and a linear shrinkage of 1%.

EXAMPLE 17

The esterification reaction product obtained according to Example 1 is employed in a one-shot system for producing semi-rigid polyurethane foam. In order to get a semi-rigid foam with open cells, the esterification reaction product is used in combination with a cell opening surfactant. The following formulation is used:

| Component: | Parts by weight |
| --- | --- |
| Glycerine polyol [1] | 100.0 |
| Cell modifying agent | 2.0 |
| Cell opener [2] | 6.0 |
| Stannous type catalyst [3] | 0.5 |
| Triethylamine | 0.025 |
| Water | 1.0 |
| Tolylene diisocyanate 80/20 | 43.4 |

[1] A mixture of equal parts of Niax Polyol LG 168 (hydroxyl number 168) and Niax Polyol LG 240 (hydroxyl number 240).
[2] Y—4490 silicon cell opening surfactant.
[3] Catalyst sold under the trade name of "Catalyst T9."

The ingredients are mixed vigorously and poured in an open mould. The cream time of the mixture is 28 seconds and the rise time is 120 seconds.

A semi-rigid foam of fine cell structure is obtained, which exhibits a negligible shrinkage. The density of the foam is 82.1 g./l.

When the cell modifying agent according to Example 1 is omitted from the above formulation, the foam will collapse. Without the Y–4499 cell-opener, a foam with closed cells and shrinkage results.

EXAMPLE 18

A mixture of 1000 parts of a technical monoglyceride of palm oil and 240 parts of fumaric acid is heated during 2 hours at a temperature of 220° C. in a nitrogen atmosphere. The viscous reaction mixture is then heated for 30 minutes at 210° C. and finally for 10 minutes at 220° C. giving a highly viscous product of hydroxyl number 73 and acid number 23. The average molecular weight of the reaction product is 1939. It contains per molecule 5 oleophilic groupings derived from palm oil fatty acids. The product is soluble in mineral oil but insoluble in water. When subjected to the "steam emulsion test" as a 0.5% solution in mineral oil of a viscosity of 4.3° E at 20° C. (Shell Risella 17) the emulsion separates no oil and water after 20 minutes and only 0.25 cm.³ of oil and no water after 60 minutes at a temperature of 93–95° C.

The above esterification reaction product is employed as cell modifying agent in the manufacture of flexible urethane foam, using the following formulation:

| Component: | Parts by weight |
| --- | --- |
| Glycerine polyol [1] | 200.0 |
| Cell modifying agent | 3.5 |
| Cell opener [2] | 0.5 |
| Tetramethylbutane diamine | 0.1 |
| Stannous type catalyst [3] | 1.0 |
| Water | 7.0 |
| Tolylene diisocyanate 80/20 | 90.0 |

[1] Thanol F—3000 a propylene oxide adduct of glycerine having a hydroxyl number of 56.
[2] L 520 silicone surfactant.
[3] Catalyst T9.

The cream time of the mixture is 15 seconds and the rise time 93 seconds. The resulting foam is cured by heating at a temperature of 100° C. for 20 minutes.

The flexible foam thus obtained has uniform, fairly fine cells of open structure. The density is 30.5 g./l. The cell modifying agent of this example is advantageously combined with a minor amount of a silicone surfactant, to obtain the desired cell opening. This minor amount of silicone surfactant is absolutely insufficient to produce a foam of uniform small-sized cells.

EXAMPLE 19

The esterification reaction product of Example 1 is used in the following formulation to produce a flexible foam. The product is applied in combination with a minor amount of an organosilicone surfactant, which functions as a cell opening agent.

| Component: | Parts by weight |
| --- | --- |
| Glycerine polyol [1] | 200.0 |
| Cell modifying agent | 4.5 |
| Cell opener [2] | 0.75 |
| Stannous type catalyst [3] | 0.8 |
| N-ethyl morpholine | 0.4 |
| Tiethylenediamine [4] | 0.2 |
| Trichlorofluormethane | 16.0 |
| Water | 7.0 |
| Tolylene diisocyanate 80/20 | 86.8 |

[1] Niax Triol LG 56 having a hydroxyl number of 56.
[2] L 520 silicone surfactant.
[3] Catalyst T9.
[4] Sold under the trade name of "Dabco."

The cream time and rise time of this formulation are 15 and 113 seconds respectively. The foam is cured by heating for 20 minutes at a temperature of 100° C.

The flexible foam thus obtained consists of fine, open cells and has a regular structure. The density is 26.0 g./l.

EXAMPLE 20

The esterification reaction product of Example 14 is used as a cell modifying agent in the following formulation on a Hennecke HZ 50 low pressure, two-component polyurethane foaming machine.

| Composition A: | Parts by weight |
| --- | --- |
| Starch-based polyol [1] | 75.0 |
| Glycerol polyol [2] | 25.0 |
| Cell modifying agent | 2.0 |
| Tetramethylbutane diamine | 0.8 |
| Triethylene diamine [3] | 1.2 |
| Water | 1.0 |
| Trichlorofluoromethane | 35.0 |
| Composition B: | |
| Diphenylmethane-4,4'-diisocyanate [4] | 148.5 |
| Flame retardant [5] | 16.5 |

[1] Fox-o-Pol S480.
[2] Caradol 520 marketed by Shell Chemical Company; hydroxyl number 520.
[3] Dabco 33 LV.
[4] Desmodur 44 V.
[5] Phosgard C 22 R containing phosphorus and chlorine.

The polyol, cell modifying agent, amine catalysts, water and trichlorofluormethane are mixed together into Composition A.

The other composition is made up by mixing the isocyanate and the flame retardant.

The two compositions are foamed on the Hennecke machine at an output of 4 kg. per minute. The cream time of this formulation is 24 seconds and the rise time 120 seconds.

A rigid urethane foam of excellent mechanical properties is obtained.

We claim:
1. A composition convertible to polyurethane foam by reaction with at least one polyisocyanate which comprises at least one organic compound having two or more reactive hydrogen atoms capable of reacting with isocyanate groups, at least one catalyst for the reaction, at least one blowing agent and an effective amount of at least one cell modifying agent, consisting, at least in part, of a high molecular weight organic emulsifying agent substantially soluble in mineral oil but substantially insoluble in water, producing emulsions of the water-in-oil type, said emulsifying agent containing ester or ether groups in its molecular structure, residues of aliphatic or alicyclic components containing at least 8 carbon atoms, and at least one residue of a member of the group consisting of a polyhydric alcohol, a polybasic acid and mixtures thereof; said organic emulsifying agent being used in an amount of up to 5.0%, based on the weight of the ultimate foam, and having an average molecular weight within the range of 1000 to 10,000, a hydroxyl number within the range of from 15 to 150, an acid number within the range of 0 to 50 and containing per molecule at least one member selected from the group consisting of (a) 2 aliphatic or alicyclic groupings with at least 21 carbon atoms,
(b) 3 aliphatic or alicyclic groupings with at least 17 carbon atoms,
(c) 4 aliphatic or alicyclic groupings with at least 14 carbon atoms,
(d) 5 aliphatic or alicyclic groupings with at least 12 carbon atoms, and
(e) 8 aliphatic or alicyclic groupings with at least 8 carbon atoms.

and having emulsifying properties such that upon subjecting 20 cm.³ of 0.5% solution of said emulsifying agent in a mineral oil of a viscosity of 1–5° Engler at 20° C. to the A.S.T.M. "steam emulsion test," the time for separating 5 cm.³ of one of the phases of the emulsions at a temperature of 93 to 95° C. is at least 20 minutes.

2. A composition convertible to polyurethane foam by reaction with at least one organic polyisocyanate in the presence of at least one catalyst for the reaction and at least one blowing agent, said composition comprising at least one organic compound having two or more reactive hydrogen atoms capable of reacting with isocyanate groups and an effective amount of a cell modifying agent, consisting, at least in part, of a high molecular weight organic emulsifying agent substantially soluble in mineral oil but substantially insoluble in water, producing emulsions of the water-in-oil type, said emulsifying agent containing ester or ether groups in its molecular structure, residues of aliphatic or alicyclic components containing at least 8 carbon atoms, and at least one residue of a member of the group consisting of a polyhydric alcohol, a polybasic acid and mixtures thereof; said organic emulsifying agent being used in an amount of up to 5.0%, based on the weight of the ultimate foam, and having an average molecular weight within the range of 1000 to 10,000, a hydroxyl number within the range of from 15 to 150, an acid number within the range of 0 to 50 and containing per molecule at least one member selected from the group consisting of (a) 2 aliphatic or alicyclic groupings with at least 21 carbon atoms,
(b) 3 aliphatic or alicyclic groupings with at least 17 carbon atoms,
(c) 4 aliphatic or alicyclic groupings with at least 14 carbon atoms,
(d) 5 aliphatic or alicyclic groupings with at least 12 carbon atoms, and
(e) 8 aliphatic or alicyclic groupings with at least 8 carbon atoms, and having emulsifying properties such that upon subjecting 20 cm.³ of 0.5% solution of said emulsifying agent in a mineral oil of a viscosity of 1–5° Engler at 20° C. to the A.S.T.M. "steam emulsion test," the time for separating 5 cm.³ of one of the phases of the emulsion at a temperature of 93 to 95° C. is at least 20 minutes.

3. In a process of making polyurethane foam by reacting a composition comprising at least one organic polyisocyanate, at least one organic compound having two or more reactive hydrogen atoms capable of reacting with isocyanate groups, at least one reaction catalyst, at least one blowing agent and an effective amount of one or more cell modifying agents, the improvement wherein at least one of the cell modifying agents is a high molecular weight emulsifying agent substantially soluble in mineral oil but substantially insoluble in water, producing heat-stable emulsions of the water-in-oil type, said emulsifying agent being used in an amount of up to 5.0%, based on the weight of the composition, and consisting essentially of esterification products obtained by the reaction in any order of (a) at least one substance capable of introducing a polyhydric alcohol residue into the esterification product,
(b) at least one substance capable of introducing a higher fatty acid residue into the esterification product, and
(c) at least one substance capable of introducing a polybasic acid residue into the esterification product, and wherein the emulsifier has an average molecular weight of from 1000 to 10,000, a hydroxyl number within the range of 15 to 150 and an acid number of 0 to 50, and having properties such that upon subjecting 20 cm.³ of 0.5% solution of said emulsifying agent in a mineral oil of a viscosity of 1–5° Engler at 20° C. to the A.S.T.M. "steam emulsion test," the time for separating 5 cm.³ of one of the phases of the emulsion at a temperature of 93 to 95° C. is at least 20 minutes.

4. The improvement according to claim 3 wherein said emulsifying agent is an esterification product obtained by the reaction in any order of (a) at least one ester of a low molecular polyhydric alcohol and a higher fatty acid, and
(b) at least one substance selected from the group consisting of polybasic carboxylic acids and polybasic carboxylic acid anhydrides.

5. The improvement according to claim 3 wherein said emulsifying agent is an esterification product obtained by the reaction of (a) at least one ester of a low molecular polyhydric alcohol and a higher fatty acid, and
(b) phosphorus oxychloride.

6. The improvement according to claim 4 wherein the polybasic carboxylic acid is an aliphatic dicarboxylic acid selected from the group consisting of maleic acid, fumaric acid, malic acid, adipic acid and sebacic acid.

7. The improvement according to claim 4 wherein the polybasic carboxylic acid anhydride is an aliphatic dicarboxylic acid anhydride selected from the group consisting of maleic anhydride and succinic anhydride.

8. In a process of making polyurethane foam by reacting a composition comprising at least one organic polyisocyanate, at least one organic compound having two or more reactive hydrogen atoms capable of reacting with isocyanate groups, at least one reaction catalyst, at least one blowing agent and an effective amount of one or more cell modifying agents, the improvement wherein at least one of the cell modifying agents is a high molecular weight emulsifying agent substantially soluble in mineral oil but substantially insoluble in water, producing heat-stable emulsions of the water-in-oil type, said emulsifying agent being used in an amount of up to 5.0%, based on the weight of the composition, and consisting essentially of an esterification product of higher fatty acids and polycondensation products of glycerol containing at least three hydroxyl groups and wherein said emulsifying agent has an average molecular weight of from 1000 to 10,000, a hydroxyl number within the range of 15 to 150 and an acid number of 0 to 50, and having properties such that upon subjecting 20 cm.³ of 0.5% solution of said emulsifying agent in a mineral oil of a viscosity of 1–5° Engler at 20° C. to the A.S.T.M. "steam emulsion test," the time for separating 5 cm.³ of one of the phases of the emulsion at a temperature of 93 to 95° C. is at least 20 minutes.

9. In a process of making polyurethane foams by reacting a composition comprising at least one organic polyisocyanate, at least one organic compound having two or more reactive hydrogen atoms capable of reacting with isocyanate groups, at least one reaction catalyst, at least one blowing agent and an effective amount of one or more cell modifying agents, the improvement wherein at least one of the cell modifying agents is a high molecular weight emulsifying agent substantially soluble in mineral oil but substantially insoluble in water, producing heat-stable emulsions of the water-in-oil type, said emulsifying agent being used in an amount of up to 5.0%, based on the weight of the composition, and consisting essentially of etherification products of
(a) at least one substance selected from the group consisting of polyepoxides, polyhalohydrins and epihalohydrins having a molecular weight not exceeding 400, and
(b) at least one monohydric alcohol selected from the group consisting of aliphatic and alicyclic alcohols containing at least 8 carbon atoms, and wherein said emulsifying agent has an average molecular weight of from 1000 to 10,000, a hydroxyl number within the range of 15 to 150 and an acid number of 0 to 50, and having properties such that upon subjecting 20 cm.$^3$ of 0.5% solution of said emulsifying agent in a mineral oil of a viscosity of 1–5° Engler at 20° C. to the A.S.T.M. "steam emulsion test," the time for separating 5 cm.$^3$ of one of the phases of the emulsion at a temperature of 93 to 95° C. is at least minutes.

10. The improvement according to claim 9 wherein said emulsifying agent is an etherification product of
(a) an aliphatic ethoxyline resin obtained from glycerol and epichlorohydrin having a molecular weight of about 300 and containing about 2 epoxy groups per molecule, and
(b) at least one monohydric alcohol selected from the group consisting of aliphatic and alicyclic alcohols containing at least 8 carbon atoms.

11. The improvement according to claim 9 wherein said emulsifying agent is an etherification product of
(a) an aromatic ethoxyline resin obtained from diphenylopropane and epochlorohydrin having a molecular weight of about 400 and containing about 2 epoxy groups per mole, and
(b) at least one monohydric alcohol selected from the group consisting of aliphatic and alicyclic alcohols containing at least 8 carbon atoms.

12. In a process of making polyurethane foam by reacting a composition comprising at least one organic polyisocyanate, at least one organic compound having two or more reactive hydrogen atoms capable of reacting with isocyanate groups, at least one reaction catalyst, at least one blowing agent and an effective amount of one or more cell modifying gents, the improvement wherein at least one of the cell modifying agents is a high molecular weight emulsifying agent substantially soluble in mineral oil but substantially insoluble in water, producing heat-stable emulsions of the water-in-oil type, said emulsifying agent being used in an amount of up to 5.0%, based on the weight of the composition, and consisting essentially of polymerization products of at least one fatty oil selected from the group consisting of drying fatty oils, semi-drying fatty oils, oxidized drying fatty oils and oxidized semi-drying fatty oils, and wherein the emulsifier has an average molecular weight of from 1000 to 10,000, a hydroxyl number within the range of 15 to 150 and an acid number of 0 to 50, and having properties such that upon subjecting 20 cm.$^3$ of 0.5% solution of said emulsifying agent in a mineral oil of a viscosity of 1–5° Engler at 20° C. to the A.S.T.M. "steam emulsion test," the time for separating 5 cm.$^3$ of one of the phases of the emulsion at a temperature of 93 to 95° C. is at least minutes.

13. In a process of making polyurethane foam by reacting a composition comprising at least one organic polyisocyanate, at least one organic compound having two or more reactive hydrogen atoms capable of reacting with isocyanate groups, at least one reaction catalyst, at least one blowing agent and an effective amount of one or more cell modifying gents, the improvement wherein at least one of the cell modifying agents is a high molecular weight emulsifying agent substantially soluble in mineral oil but substantially insoluble in water, producing heat-stable emulsions of the water-in-oil type, said emulsifying agent being used in an amount of up to 5.0%, based on the weight of the composition, and consisting essentially of addition products obtained by the reaction of an unconjugated vegetable drying oil and a substance selected from the group consisting of ethene-alpha, beta-dicharboxylic acids and anhydrides thereof, said reaction being carried out in the presence of an organic peroxide, and wherein the emulsifier has an average molecular weight of from 1000 to 10,000, a hydroxyl number within the range of 15 to 150 and an acid number of 0 to 50, and having properties such that upon subjecting 20 cm.$^3$ of 0.5% solution of said emulsifying agent in a mineral oil of a viscosity of 1–5° Engler at 20° C. to the A.S.T.M. "steam emulsion test," the time for separating 5 cm.$^3$ of one of the phases of the emulsion at a temperature of 93 to 95° C. is at least 20 minutes.

14. In a process of making polyurethane foam by reacting a composition comprising at least one organic polyisocyanate, at least one organic compound having two or more reactive hydrogen atoms capable of reacting with isocyanate groups, at least one reaction catalyst, at least one blowing agent, and an effective amount of one or more cell modifying agents, the improvement wherein at least one of the cell modifying agents is an organic emulsifying agent containing ester or ether groups in its molecular structure, residues of aliphatic or alicyclic components containing at least 8 carbon atoms, and at least one residue of a member of the group consisting of a polyhydric alcohol, a polybasic acid and mixtures thereof; said organic emulsifying agent being used in an amount of up to 5.0, based on the weight of the composition, and having an average molecular weight within the range of 1000 to 10,000, a hydroxyl number within the range of from 15 to 150, an acid number within the range of 0 to 50 and containing per molecule at least one member selected from the group consisting of (a) 2 aliphatic or alicyclic groupings with at least 21 carbon atoms,
(b) 3 aliphatic or alicyclic groupings with at least 17 carbon atoms,
(c) 4 aliphatic or alicyclic groupings with at least 14 carbon atoms,
(d) 5 aliphatic or alicyclic groupings with at least 12 carbon atoms, and
(e) 8 aliphatic or alicyclic groupings with at least 8 carbon atoms, said emulsifying agent being substantially soluble in mineral oil but substantially insoluble in water, producing heat-stable emulsions of the water-in-oil type, and having properties such that upon subjecting 20 cm.$^3$ of 0.5% solution of said emulsifying agent in a mineral oil of a viscosity of 1–5° Engler at 20° C. to the A.S.T.M. "steam emulsion test," the time for separating 5 cm.$^3$ of one of the phases of the emulsion at a temperature of 93 to 95° C. is at least 20 minutes.

15. The improvement according to claim 14 wherein the organic compounds having two or more reactive hydrogen atoms capable of reaction with isocyanate groups are at least trifunctional and have a hydroxyl number of at least 400.

16. The improvement according to claim 14 wherein said trifunctional organic compound having a hydroxyl number of at least 400 is a polyetherpolyol.

17. The improvement according to claim 14 wherein the organic compounds having two or more reactive hydrogen atoms capable of reaction with isocyanate groups are at most trifunctional and have a hydroxyl number lower than 400, and wherein said high molecular weight emulsifying agent is used in combination with a cell opener.

18. A composition convertible to polyurethane foam by reaction with at least one organic polyisocyanate, said composition comprising at least one organic compound having two or more reactive hydrogen atoms capable of reacting with isocyanate groups, at least one catalyst for the reaction, at least one blowing agent and an effective amount of at least one cell modifying agent, at least in part consisting of an esterification product of (a) at least one substance capable of introducing a polyhydric alcohol residue into the esterification product,
(b) at least one substance capable of introducing a higher fatty acid residue into the esterification products, and
(c) at least one organic polyisocyanate, and wherein the esterification product has an average molecular weight of from 1000 to 10,000, a hydroxyl number within the range of 15 to 150 and an acid number of 0 to 50, said esterification product being used in an amount of up to 5.0%, based on the weight of the ultimate foam, and having properties such that upon subjecting 20 cm.$^3$ of 0.5% solution of said emulsifying agent in a mineral oil of a viscosity of 1–5° Engler at 20° C. to the A.S.T.M. "steam emulsion test," the time for separating 5 cm.$^3$ of one of the phases of the emulsion at a temperature of 93 to 95° C. is at least 20 minutes.

19. A composition convertible to a polyurethane foam by reaction with at least one organic polyisocyanate in the presence of at least one catalyst for the reaction and at least one blowing agent, said composition comprising at least one organic compound having two or more reactive hydrogen atoms capable of reacting with isocyanate groups and an effective amount of one or more cell modifying agents, wherein at least one of the cell modifying agents is a high molecular weight emulsifying agent substantially soluble in mineral oil but substantially insoluble in water, and producing heat-stable emulsions of the water-in-oil type, said emulsifying agent being used in an amount of up to 5.0%, based on the weight of the ultimate foam, and consisting essentially of an esterification product of (a) at least one substance capable of introducing a polyhydric alcohol residue into the esterification product,
(b) at least one substance capable of introducing a higher fatty acid residue into the esterification products, and
(c) at least one organic polyisocyanate, and wherein the emulsifier has an average molecular weight of from 1000 to 10,000, a hydroxyl number within the range of 15 to 150 and an acid number of 0 to 50, and having properties such that upon subjecting 20 cm.$^3$ of 0.5% solution of said emulsifying agent in a mineral oil of a viscosity of 1–5° Engler at 20° C. to the A.S.T.M. "steam emulsion test," the time for separating 5 cm.$^3$ of one of the phases of the emulsion at a temperature of 93 to 95° C. is at least 20 minutes.

20. In a process of making a polyurethane foam by reacting a composition comprising at least one organic polyisocyanate, at least one organic compound having two or more reactive hydrogen atoms capable of reacting with isocyanate groups, at least one reaction catalyst, at least one blowing agent, and an effective amount of one or more cell modifying agents, the improvement that at least one of the cell modifying agents is a high molecular weight emulsifying agent, being used in an amount of up to 5.0%, based on the weight of the composition, said emulsifying agent being substantially soluble in mineral oil but substantially insoluble in water, producing heat-stable emulsions of the water-in-oil type and being an esterification product of (a) at least one substance capable of introducing a polyhydric alcohol residue into the esterification product,
(b) at least one substance capable of introducing a higher fatty acid residue into the esterification product, and
(c) at least one oragnic polyisocyanate, and having emulsifying properties such that upon subjecting 20 cm.$^3$ of a 0.5% solution of said emulsifying agent in a mineral oil of a viscosity of 1–5° Engler at 20° C. to the A.S.T.M. "steam emulsion test," the time for separating 5 cm.$^3$ of one of the phases of the emulsion at a temperature of 93 to 95° C. is at least 20 minutes, said emulsifying agent further being characterized by having an average molecular weight within the range of from 1000 to 10,000, a hydroxyl number within the range of from 15 to 150, and an acid number of from 0 to 50.

21. A product obtained by the process of claim 14.

References Cited

UNITED STATES PATENTS

| | | | |
|---|---|---|---|
| 2,772,245 | 11/1956 | Simon et al. | 260—2.5 |
| 2,788,335 | 4/1957 | Barthel | 260—2.5 |
| 2,955,091 | 10/1960 | Kane | 260—2.5 |
| 2,999,823 | 9/1961 | Dombrow | 260—2.5 |
| 3,106,537 | 12/1963 | Simon et al. | 260—2.5 |
| 3,242,108 | 3/1966 | Mc Gary et al. | 260—2.5 |
| 3,399,154 | 8/1968 | Bernstein et al. | 260—22 |

FOREIGN PATENTS

| | | |
|---|---|---|
| 647,133 | 12/1950 | Great Britain. |
| 887,442 | 1/1962 | Great Britain. |

DONALD E. CZAJA, Primary Examiner

H. S. COCKERAM, Assistant Examiner